United States Patent [19]

Kuwahara

[11] Patent Number: 5,337,862
[45] Date of Patent: Aug. 16, 1994

[54] EDDY-CURRENT BRAKE WITH MAGNETS SHAPED TO CONTAIN MAGNETIC FIELD

[75] Inventor: Tohru Kuwahara, Kawasaki, Japan
[73] Assignee: Isuzu Motors, Ltd., Tokyo, Japan
[21] Appl. No.: 44,322
[22] Filed: May 24, 1993

Related U.S. Application Data

[63] Continuation of Ser. No. 716,845, Jun. 17, 1991, abandoned.

[30] Foreign Application Priority Data

Jun. 20, 1990 [JP] Japan ................ 2-162196

[51] Int. Cl.5 .................. B60L 7/28; H02K 49/04
[52] U.S. Cl. .................. 188/158; 188/161; 192/84 PM; 310/105; 310/114
[58] Field of Search .......... 188/161, 164, 155, 267, 188/158; 192/84 PM; 310/105, 114, 103, 106, 209, 93; 335/304, 306

[56] References Cited

U.S. PATENT DOCUMENTS

| | | | |
|---|---|---|---|
| 3,488,535 | 1/1970 | Baermann | 310/105 X |
| 4,974,706 | 12/1990 | Maji et al. | 188/164 X |
| 5,023,499 | 6/1991 | Kuwahara | 188/164 X |
| 5,054,587 | 10/1991 | Matsui et al. | 188/267 |
| 5,064,029 | 11/1991 | Araki et al. | 310/105 X |
| 5,145,038 | 9/1992 | Kuwahara | 310/105 X |

FOREIGN PATENT DOCUMENTS 0505647 8/1930 Fed. Rep. of Germany ...... 310/93
0412659 4/1990 Japan .

*Primary Examiner*—Robert J. Oberleitner
*Assistant Examiner*—Josie A. Ballato
*Attorney, Agent, or Firm*—John E. Toupal; Harold G. Jarcho

[57] ABSTRACT

An eddy current retarder for an automotive vehicle braking system including an annular fixed frame defining a hollow chamber is disposed internally of a brake drum, a pair of transversely adjacent parallel support rings disposed in the chamber of the fixed frame, one of the support rings being fixed to the frame and the other being rotatable to permit relative angular movement therebetween. Each support ring supports a plurality of permanent magnets circumferentially spaced apart at a given pitch and having outwardly facing alternating polarities. Ferromagnetic plates circumferentially spaced apart at the given pitch are embedded in an outer wall of the fixed frame between the magnets and the brake drum. The ferromagnetic plates have central portions thicker than transversely projecting end portions.

11 Claims, 4 Drawing Sheets

EDDY-CURRENT BRAKE WITH MAGNETS SHAPED TO CONTAIN MAGNETIC FIELD

This is a continuation of copending application(s) Ser. No. 07/716,845 filed on Jun. 17, 1991, now abandoned.

BACKGROUND OF THE INVENTION

The present invention relates to a braking system for use principally on a large vehicle and, more particularly, to an eddy-current type retarder for assisting a friction brake.

Eddy-current retarders for braking systems typically include a pair of transversely adjacent support rings each having a number of permanent magnets facing the inner peripheral surface of a brake drum. The polarities of the magnets on each support ring are alternately different in a circumstantial direction and are secured to a fixed frame disposed internally of the brake drum. One of the support rings is fixed to the frame while the other support ring is rotatable to provide relative angular movement between the magnets and thereby switch between an operational mode in which torque is applied to the brake drum and an operational mode in which torque is not applied thereto.

The present applicant has previously disclosed an eddy-current type vehicle braking system in Japanese Patent Application No. 112026/1990 and as shown in FIG. 8. In this eddy-current retarder, a boss portion 5 of a brake drum 7 and a parking brake drum 3 are coupled by a bolt 4 to a flange 2 coupled to an output rotational shaft 1 of a vehicle transmission. The boss portion 5 is joined by a number of radially extending spokes 6 to the right end of the brake drum 7 which is provided on its outer peripheral surface with cooling fins 8. An annular box shaped, fixed frame 22 is formed of a non-magnetic material so as to provide magnetic shielding. The frame 22 defines an annular chamber arranged interiorly of the brake drum 7 which is formed of an electric conductive material.

The fixed frame 22 is secured, for example, to the outer wall of a gear box of the transmission (not shown). First and second magnet support rings 13 and 14, respectively, are formed of magnetic material and are encased in the annular chamber defined by the fixed frame 22. The second support ring 14 is secured to a right end wall of the fixed frame 22 by a bolt 21 while the first support ring 13 is rotatably supported on an inner peripheral wall 9 of the fixed frame 22 by bearings 12. Mounted on the first support ring 13 are a plurality of first permanent magnets 13a circumferentially spaced apart at a given pitch. Similarly, mounted on the second support ring 14 are a plurality of second permanent magnets 14a also circumferentially spaced apart at the given pitch. The permanent magnets 13a and 14a are arranged so that the polarities thereof are alternately different in a circumferential direction.

Provided in an outer peripheral wall 11 of the fixed frame 22 are slots aligned with outer surfaces of the second permanent magnets 14a. A ferromagnetic plate member 15 is fitted into each slot in the outer wall 11. Preferably, the outer peripheral wall 11 is coated with a low-friction film, and the ferromagnetic plates 15 are embedded in the slots in the fixed frame 22.

A hydraulic adjustment actuator 20 formed integrally with a left end wall of the fixed frame 22 functions to rotate the first support ring 13 so as to produce angular movement thereof relative to the second support ring 14. Included in the hydraulic actuator 20 is a piston 17 fitted into a cylinder 18 extending peripherally of the fixed frame 22. An arm 16 protruding from the first support ring 13 through a slot in the left end wall of the fixed frame 22 is connected to a rod extending from the piston 17 outwardly of the cylinder 18.

When braking of the vehicle is not required, the first permanent magnets 13a on the first support ring 13 are positioned such that its poles facing the brake drum 7 are transversely aligned with opposite poles of the second permanent magnets 14a are shown in FIG. 9. Consequently, there are formed magnetic closed circuits each composed of a N-pole of a permanent magnet 14a, a ferromagnetic plate 15, a permanent magnet 13a, a pair of the support rings 13 and 14, and a S-pole of a permanent magnet 14a as shown by the arrows in FIG. 8. The magnetic field directed radially outwardly between the permanent magnets 13a and 14a and the inner peripheral surface of the brake drum 7 therefore is so weak that brake torque is not applied.

When braking action is required, the first support ring 13 is rotated by the hydraulic actuator 20 to position the first and second permanent magnets 13a and 14a such that like poles facing the brake drum 7 are aligned transversely as shown in FIG. 10. Accordingly, as shown in FIG. 11, there are formed closed magnetic circuits each composed of a N-pole of a permanent magnet 14a, a ferromagnetic plate 15, the brake drum 7, an adjacent ferromagnetic plate 15, an adjacent permanent magnet 14a, the support ring 14 and an S-pole of the original permanent magnet 14a. Similar magnetic circuits are formed by the permanent magnets 13a. When the brake drum 7 rotates across the magnetic field extending radially outwardly from the permanent magnets 13a and 14a to the inner peripheral surface of the brake drum 7, an eddy-current is generated which produces a braking torque.

In the aforementioned type of eddy-current retarder, it is preferable that the ferromagnetic plate members 15 be thick to reduce magnetic resistance and thereby reduce the magnetic flux leaked to the brake drum 7 during non-braking periods. However, when the ferromagnetic plates 15 are made thick, the weight of the retarder undesirably increases; the magnetic gap between the permanent magnets 13a, 14a and the inner peripheral surface of the brake drum 7 becomes large to reduce the magnetic field applied to the brake drum 7 during braking; and the dimensions of the permanent magnets 13a, 14a and support rings 13, 14 encased within the fixed frame 22 are restricted.

The object of the present invention, therefore, is to provide an improved eddy-current type braking system in which the above described disadvantages are alleviated.

SUMMARY OF THE INVENTION

The present invention provides an arrangement wherein a fixed frame forms an annular chamber internally of a brake drum. One of a pair of transversely, parallel support rings is secured within the annular chamber of the fixed frame while the other ring is rotatable therein. Mounted on each support ring and facing the brake drum are a plurality of permanent magnets having circumferentially alternating polarities. The magnets on each ring are spaced circumferentially at the same pitch. Also supported by the frame between the permanent magnets and the brake drum are a plurality of ferromagnetic plate members also circumferentially spaced apart at the given pitch and transversely aligned with the permanent magnets of the fixed support ring. Preferably, the plate members are embedded in slots in an outer peripheral wall of the fixed frame and each ferromagnetic plate member includes a central portion that is thicker than transversely extending end portions thereof. Outer surfaces of each of the permanent magnets conform with inner surfaces of the ferromagnetic plate members so as to provide therewith a uniform gap.

Magnetic short circuits composed of transversely aligned permanent magnets of opposite polarity, the adjacent support rings and the thick central portions of the plate members are formed during non-braking operation. Because of the thick central portions of the plate members, the magnetic resistance is low providing during non-braking operation extremely effective magnetic short circuits that limit the leakage flux applied to the brake drum. Accordingly, undesirable drag torque on the brake drum is reduced. Conversely, the less thick opposite ends of the ferromagnetic plate members establish narrow gaps between the brake drum and the permanent magnets during braking operations. Effective braking torque is provided, therefore, and the overall weight of the plate members and associated assembly components is minimized.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
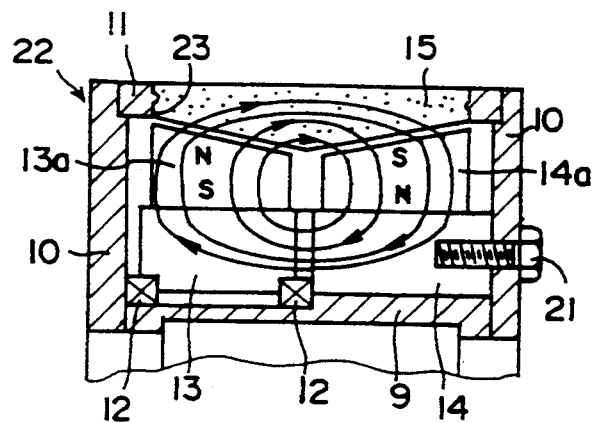
FIGS. 1 to 7 are, respectively, side sectional views of eddy-current type retarder brake system embodiments according to the present invention.

FIGS. 1 to 5 illustrate eddy-current type braking systems according to the present invention. In each embodiment, an annular fixed frame 22 is disposed internally of a brake drum (not shown) in the manner shown in FIG. 8. Annular end walls 10 connected between a circular inner peripheral wall 9 and a circular outer peripheral wall 11 form an annular chamber. The inner and outer walls 9 and 11 are formed of a non-magnetic material. A first support ring 13 and a laterally adjacent parallel second support ring 14 are encased in the hollow chamber formed by the frame 22. Rotatably supporting the first support ring 13 on the inner wall 9 are bearings 12. The second support ring 14 is secured to the right end wall 10 by bolts 21. Circumferentially spaced at a given pitch on the first support ring 13 and facing outwardly are a plurality of first permanent magnets 13a. Similarly, a second plurality of permanent magnets 14a are circumferentially spaced at the given pitch on the outer peripheral surface of the support ring 14. As in the system shown in FIG. 8, the outwardly facing polarities of the circumferentially spaced permanent magnets 13a and 14a alternate on, respectively, the support rings 13 and 14. Fitted into slots 23 in the outer peripheral wall 11 are ferromagnetic plate members 15, also spaced apart at the given pitch so as to be in radial alignment with the permanent magnets 14a. The arrangement and function of the rotatable support ring 13 is to transversely align the permanent magnets 13a and 14a with either like or opposite outwardly facing polarities as shown in, respectively, FIGS. 9 and 10.

Figure 8:
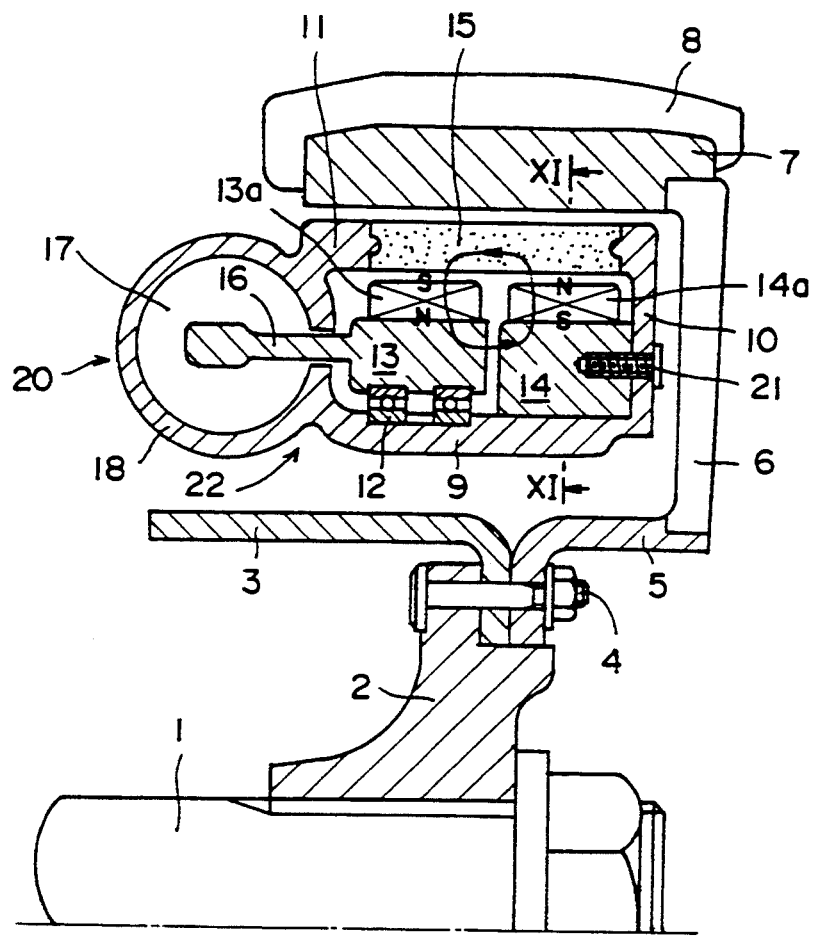
FIG. 8 is a side sectional view of a conventional eddy-current type retarder brake system.
Figures 9, 10:
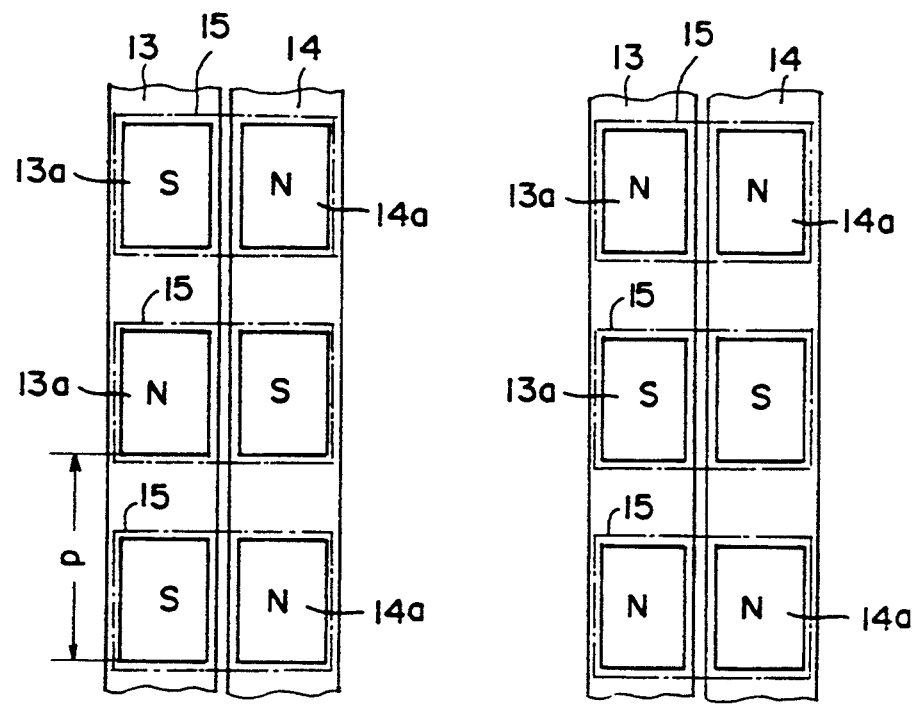
FIGS. 9 and 10 are developed views showing the peripheral arrangements of permanent magnets during, respectively, non-braking and braking operations.
Figure 11:
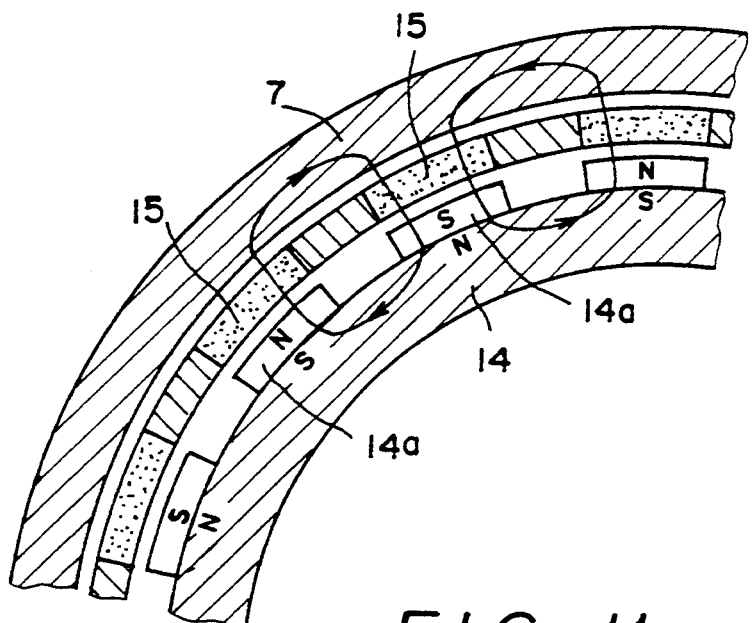
FIG. 11 is a front sectional view taken on the lines XI—XI of FIG. 8.

However, in the embodiments of FIGS. 1-5, each ferromagnetic plate member 15 has an outer surface parallel to an inner surface of a brake drum as shown in FIG. 8, a middle portion of greater thickness than transversely joined end portions, and an irregular inner surface conforming to outer surfaces of the permanent magnets 13a, 14a so as to provide a uniform gap therebetween.

In the embodiment shown in FIG. 1, the cross-section of the ferromagnetic plate member 15 is in the shape of an inwardly projecting V formed by intersecting conically shaped surfaces. The permanent magnets 13a and 14a are formed into outwardly opening V-shaped grooves conforming to the inner surfaces of the ferromagnetic plate members 15. Thus, the central portions of the plate members are thicker than transversely joined end portions thereof.

According to the FIG. 1 embodiment, when the support ring 13 is rotated to reverse the polarities of the transversely aligned permanent magnets 13a and 14a (FIG. 9) magnetic short circuits are formed, each composed of a permanent magnet 13a, a thick central portion of a ferromagnetic plate member 15, a permanent magnet 14a, the support ring 14 and the support ring 13 as shown by the arrows. Since the ferromagnetic plate member 15 is thick in the central portion thereof which is densest in magnetic flux, the magnetic resistance is small and accordingly, leakage flux is low between the permanent magnets 13a and 14a and the inner surface of the brake drum 7. Consequently, undesirable drag torque of the brake drum 7 also is small. In addition, since the opposite ends of the ferromagnetic plate 15 are thin, a reduction in the weight of the ferromagnetic plate members 15 is obtained. However, when the support ring is rotated into its braking position to establish like polarities for transversely aligned permanent magnet is 13a, 14a (FIG. 10), magnetic circuits are created, each composed of either circumferentially adjacent permanent magnets 13a or 14a, the support rings 13 or 14, the narrow opposite ends of circumferentially adjacent plate members 14, and the brake drum 7. The narrow gap formed by the ends of the plate members 15 and between the magnets 13a, 14a and the brake drum 7 enhances braking torque.

Figure 2:
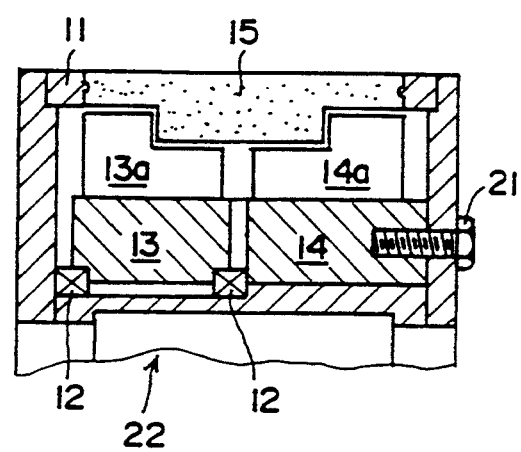

In the embodiment shown in FIG. 2, the ferromagnetic plate member 15 has a cylindrical central portion of greater thickness than transversely straddling cylindrical end portions so as to form an irregular inner surface. The cross-sections of each of the permanent magnets 13a and 14a are in the shape of an L so as to conform to the inner surface of the ferromagnetic plate member 15. The operation of the FIG. 2 embodiment is the same as described above for the FIG. 1 embodiment.

Figure 3:
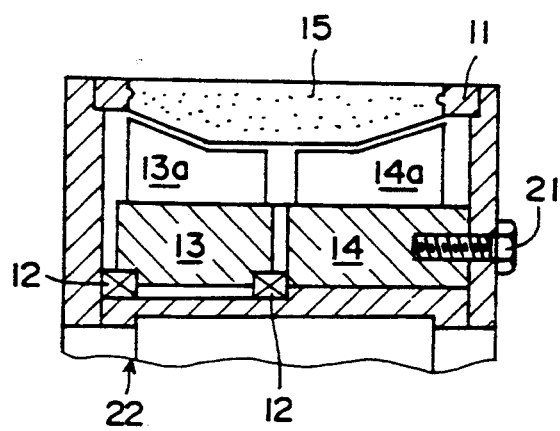

In the embodiment shown in FIG. 3, the irregular inner surface of the ferromagnetic plate member 15 is formed by a cylindrical central portion intersected by conically shaped opposite end portions. Again the outer surfaces of the magnet is 13a, 14a are shaped to conform to the inner surface of the member 15 so as to provide a uniform gap therebetween.

Figure 4:
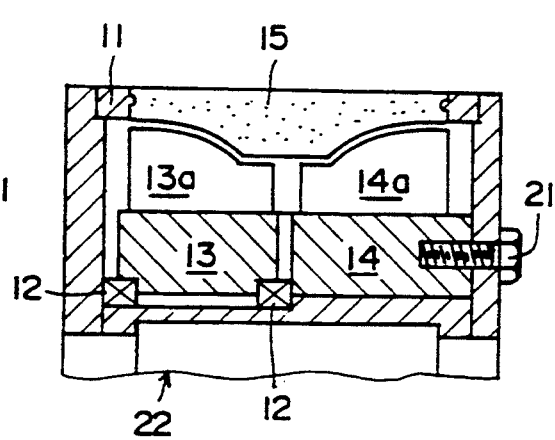

In the embodiment shown in FIG. 4, the irregular inner surface of the ferromagnetic plate member 14 is formed by a cylindrical central portion intersected by parabolically shaped opposite end portions. The outer surfaces of the magnets 13a, 14a again are shaped to conform to the inner surface of the plate member 15.

Figure 5:
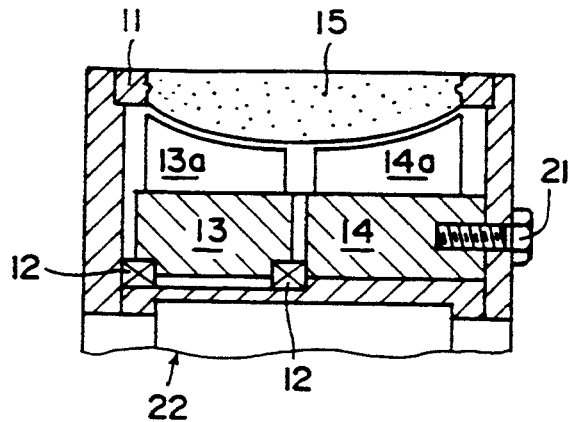

In the embodiment shown in FIG. 5, the cross-section of the ferromagnetic plate member 15 again is thickest in a central portion in that the irregular inner surface thereof is arcuately convex. The outer surfaces of the magnets 13a, 14a are convex to conform to the inner surface of the plate member 15.

Figure 6:
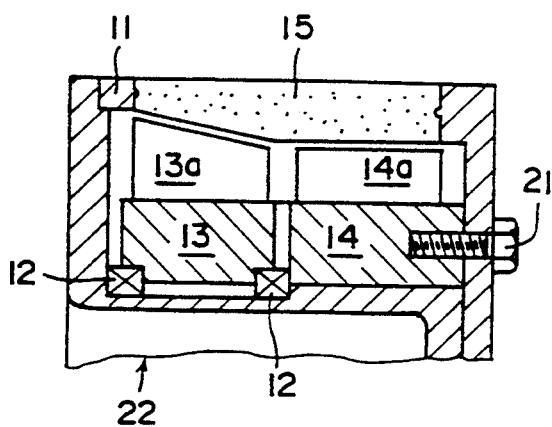

In the embodiment shown in FIG. 6, the cross-section of the ferromagnetic plate member 15 is such that the inner surface of the right half is parallel with the inner surface of the brake drum, and the inner surface of the left half is inclined with respect thereto so that it becomes thinner toward its outer end. The outer magnet surfaces again conform.

Figure 7:
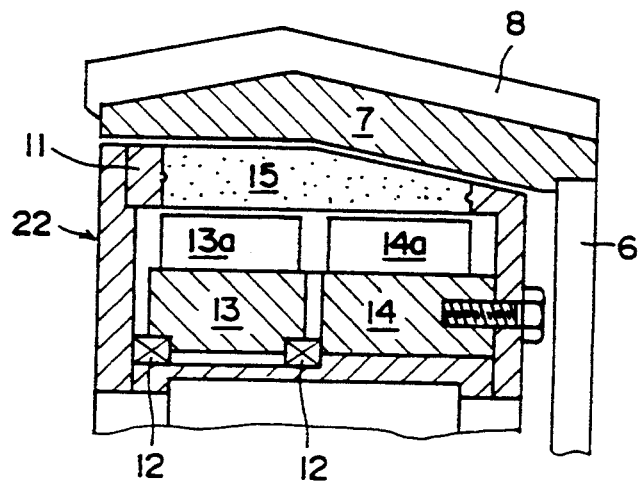

In the embodiment shown in FIG. 7, the cross-section of the ferromagnetic plate member 15 is such that the inner surface thereof is cylindrical and the brake drum, the outer surface thereof is irregular with a cylindrical left end portion and a conically shaped narrow right end portion. The inner surface of the brake drum 7 also is irregular to conform to the outer surface of the plate member 7 and thereby provide a uniform gap therebetween. Operation of the FIG. 7 embodiment is the same as described above.

Obviously, many modifications and variations of the present invention are possible in light of the above teachings. It is to be understood, therefore, that the invention can be practiced otherwise than as specifically described.

What is claimed is:

1. A vehicle braking system comprising:
   a brake drum having an inner surface;
   an annular substantially non-magnetic, fixed frame disposed within said brake drum and defining an annular chamber, said frame comprising an annular outer wall disposed adjacent to said inner surface and defining a plurality of circumferentially spaced apart slots, and said ferromagnetic members are retained within said slots;
   first and second substantially parallel, transversely aligned support rings disposed in said annular chamber;
   a plurality of first permanent magnets mounted on said first support ring and circumferentially spaced apart at a given pitch, the polarities of said first permanent magnets facing said inner surface alternating circumferentially;
   a plurality of second permanent magnets mounted on said second support ring and circumferentially spaced apart at said given pitch, the polarities of said second permanent magnets facing said inner surface alternating circumferentially;
   adjustment means for producing relative rotational movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and
   a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein said first and second permanent magnets have outer surfaces arranged to define with said ferromagnetic members a substantially uniform gap when circumferentially aligned therewith, each of said ferromagnetic members has an irregular inner surface formed by a cylindrically shaped portion intersecting a conically shaped portion, and said first and second permanent magnets have irregular outer surfaces conforming to said irregular inner surfaces.

2. A vehicle braking system comprising:
   a brake drum having an inner surface;
   an annular substantially non-magnetic, fixed frame disposed within said brake drum and defining an annular chamber; said frame comprising an annular outer wall adjacent to said inner surface and defining a plurality of circumferentially spaced apart slots, and said ferromagnetic members are retained within said slots;
   first and second substantially parallel, transversely aligned support rings disposed in said annular chamber;
   a plurality of first permanent magnets mounted on said first support ring and circumferentially spaced apart at a given pitch, the polarities of said first permanent magnets facing said inner surface alternating circumferentially;
   a plurality of second permanent magnets mounted on said second support ring and circumferentially spaced apart at said given pitch, the polarities of said second permanent magnets facing said inner surface alternating circumferentially;
   adjustment means for producing relative rotational movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and
   a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein said first and second permanent magnets have outer surfaces arranged to define with said ferromagnetic members a substantially uniform gap when circumferentially aligned therewith, each of said ferromagnetic members has an irregular inner surface, and said first and second permanent magnets have irregular outer surfaces conforming to said irregular inner surfaces, and each of said ferromagnetic members has a central portion of greater thickness than transversely spaced apart end portions joined by said central portion.

3. A vehicle braking system comprising:

a brake drum having an inner surface;

an annular substantially non-magnetic, fixed frame disposed within said brake drum and defining an annular chamber, said frame comprising an annular outer wall adjacent to said inner surface and defining a plurality of circumferentially spaced apart slots, and said ferromagnetic members are retained within said slots;

first and second substantially parallel, transversely aligned support rings disposed in said annular chamber;

a plurality of first permanent magnets mounted on said first support ring and circumferentially spaced apart at a given pitch, the polarities of said first permanent magnets facing said inner surface alternating circumferentially;

a plurality of second permanent magnets mounted on said second support ring and circumferentially spaced apart at said given pitch, the polarities of said second permanent magnets facing said inner surface alternating circumferentially;

adjustment means for producing relative rotational movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein said first and second permanent magnets have outer surfaces arranged to define with said ferromagnetic members a substantially uniform gap when circumferentially aligned therewith, each of said ferromagnetic members has an irregular inner surface, said first and second permanent magnets have irregular outer surfaces conforming to said irregular inner surfaces, and each said irregular inner surface comprises intersecting conically shaped portions.

4. A vehicle braking system comprising:

a brake drum having an inner surface;

an annular substantially non-magnetic, fixed frame disposed within said brake drum and defining an annular chamber, said frame comprising an annular outer wall adjacent to said inner surface and defining a plurality of circumferentially spaced apart slots, and said ferromagnetic members are retained within said slots;

first and second substantially parallel, transversely aligned support rings disposed in said annular chamber;

a plurality of first permanent magnets mounted on said first support ring and circumferentially spaced apart at a given pitch, the polarities of said first permanent magnets facing said inner surface alternating circumferentially;

a plurality of second permanent magnets mounted on said second support ring and circumferentially spaced apart at said given pitch, the polarities of said second permanent magnets facing said inner surface alternating circumferentially;

adjustment means for producing relative rotational movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein said first and second permanent magnets have outer surfaces arranged to define with said ferromagnetic members a substantially uniform gap when circumferentially aligned therewith, each of said ferromagnetic members has an irregular inner surface, said first and second permanent magnets have irregular outer surfaces conforming to said irregular inner surfaces, and each said ferromagnetic member comprises a cylindrical central portion of greater thickness than cylindrical end portions straddling said central portion.

5. A vehicle braking system comprising:

a brake drum having an inner surface;

an annular substantially non-magnetic, fixed frame disposed within said brake drum and defining an annular chamber, said frame comprising an annular outer wall disposed adjacent to said inner surface and defining a plurality of circumferentially spaced apart slots, and said ferromagnetic members are retained within said slots;

first and second substantially parallel, transversely aligned support rings disposed in said annular chamber;

a plurality of first permanent magnets mounted on said first support ring and circumferentially spaced apart at a given pitch, the polarities of said first permanent magnets facing said inner surface alternating circumferentially;

a plurality of second permanent magnets mounted on said second support ring and circumferentially spaced apart at said given pitch, the polarities of said second permanent magnets facing said inner surface alternating circumferentially;

adjustment means for producing relative rotational movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein said first and second permanent magnets have outer surfaces arranged to define with said ferromagnetic members a substantially uniform gap when circumferentially aligned therewith, each of said ferromagnetic members has an irregular inner surface, said first and second permanent magnets have irregular outer surfaces conforming to said irregular inner surfaces, and each said irregular inner surface is arcuately convex.

6. A vehicle braking system comprising:

a brake drum having an inner surface;

an annular substantially non-magnetic, fixed frame disposed within said brake drum and defining an annular chamber, said frame comprising an annular outer wall disposed adjacent to said inner surface and defining a plurality of circumferentially spaced apart slots, and said ferromagnetic members are retained within said slots;

first and second substantially parallel, transversely aligned support rings disposed in said annular chamber;

a plurality of first permanent magnets mounted on said first support ring and circumferentially spaced apart at a given pitch, the polarities of said first permanent magnets facing said inner surface alternating circumferentially;

a plurality of second permanent magnets mounted on said second support ring and circumferentially spaced apart at said given pitch, the polarities of said second permanent magnets facing said inner surface alternating circumferentially;

adjustment means for producing relative rotational movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein said first and second permanent magnets have outer surfaces arranged to define with said ferromagnetic members a substantially uniform gap when circumferentially aligned therewith, each of said ferromagnetic members has an irregular inner surface, said first and second permanent magnets have irregular outer surfaces conforming to said irregular inner surfaces, and each said irregular inner surface comprises a cylindrical central portion intersected by conically shaped end portions.

7. A vehicle braking system comprising:

a brake drum having an inner surface;

an annular substantially non-magnetic, fixed frame disposed within said brake drum and defining an annular chamber, said frame comprising an annular outer wall disposed adjacent to said inner surface and defining a plurality of circumferentially spaced apart slots, and said ferromagnetic members are retained within said slots;

first and second substantially parallel, transversely aligned support rings disposed in said annular chamber;

a plurality of first permanent magnets mounted on said first support ring and circumferentially spaced apart at a given pitch, the polarities of said first permanent magnets facing said inner surface alternating circumferentially;

a plurality of second permanent magnets mounted on said second support ring and circumferentially spaced apart at said given pitch, the polarities of said second permanent magnets facing said inner surface alternating circumferentially;

adjustment means for producing relative rotational movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein said first and second permanent magnets have outer surfaces arranged to define with said ferromagnetic members a substantially uniform gap when circumferentially aligned therewith, each of said ferromagnetic members has an irregular inner surface, said first and second permanent magnets have irregular outer surfaces conforming to said irregular inner surfaces, and each said irregular inner surface comprises a cylindrical central portion intersected by parabolically shaped end portions.

8. A vehicle braking system comprising:

a brake drum having an inner surface;

an annular fixed frame disposed within said brake drum and defining an annular chamber;

first and second substantially parallel, transversely aligned support rings disposed in said annular chamber;

a plurality of first permanent magnets mounted on said first support ring and circumferentially spaced apart at a given pitch, the polarities of said first permanent magnets facing said inner surface alternating circumferentially;

a plurality of second permanent magnets mounted on said second support ring and circumferentially spaced apart at said given pitch, the polarities of said second permanent magnets facing said inner surface alternating circumferentially;

adjustment means for producing relative angular movement between said first and second support rings so as to establish a braking condition in which each of said first permanent magnets with a given polarity facing said inner surface is transversely aligned with a different one of said second permanent magnets having a polarity facing said inner surface opposite to said given polarity and an alternate non-braking condition in which each of said permanent magnets with a given polarity facing said inner surface is transversely aligned with a different one of said second permanent magnets having said given polarity facing said inner surface; and a plurality of ferromagnetic members circumferentially spaced apart at said given pitch in alignment with said second permanent magnets and disposed between said inner surface and said first and second permanent magnets, each pair of said transversely aligned pairs of said first and second permanent magnets in said non-braking condition forming with one of said ferromagnetic members a magnetic path, and each of said ferromagnetic members having a length portion of non-uniform thickness extending in said magnetic path formed thereby with said pair of magnets; and wherein each of said ferromagnetic members has an irregular outer surface, and said inner surface of said brake drum is irregularly shaped and conforms to said irregular outer surface so as to define therebetween a uniform gap.

9. A system according to claim 8 wherein said frame is formed substantially of non-magnetic material.

10. A system according to claim 8 wherein said adjustment means comprises rotation means for providing rotation of said first support ring with respect to said second support ring.

11. A system according to claim 8 wherein each of said ferromagnetic members has a central portion of greater thickness than transversely spaced apart end portions joined by said central portion.

* * * * *